(No Model.) 2 Sheets—Sheet 1.

R. P. SCOTT.
VINE PULLING MACHINE.

No. 549,260. Patented Nov. 5, 1895.

Witnesses:
T. C. Brecht
Frank R. Smith

Inventor:
Robert P. Scott (No Model.) 2 Sheets—Sheet 2.

R. P. SCOTT.
VINE PULLING MACHINE.

No. 549,260. Patented Nov. 5, 1895.

Witnesses: Inventor:

UNITED STATES PATENT OFFICE.

ROBERT P. SCOTT, OF CADIZ, OHIO.

VINE-PULLING MACHINE.

SPECIFICATION forming part of Letters Patent No. 549,260, dated November 5, 1895.

Application filed April 13, 1893. Serial No. 470,259. (No model.)

*To all whom it may concern:*

Be it known that I, ROBERT P. SCOTT, residing at Cadiz, Harrison county, Ohio, have invented a new and useful Green-Pea-Vine-Pulling Machine, of which the following is a specification, reference being had to the accompanying drawings.

The object of my invention is to produce a machine for pulling green pea-vines from the earth by the roots and for discharging the pulled vines in heaps upon the ground.

Generally speaking, the machine consists of a carriage, upon which one or more frames of parallel pulling-fingers are mounted in such a manner as to follow all the inequalities of the rough ground in which the vines are growing. This feature of having the pulling-fingers follow the ground is of extreme importance, since it is necessary that the points of the fingers should strike the vines near the roots and that they should lie flat on the ground throughout their length, so as not to dig into the earth, which they would do if inclined upward and backward. I preferably employ two frames of pulling-fingers, one in advance of the other, so that the vines which have been missed by the forward frame may be gathered by that in the rear and so that the machine need not be stopped in discharging the vines from the fingers, which would be the case if only one frame were employed, in order to have at least one frame go over all the vines on the field. Again, since pea-vines are of rather small diameter and quite tough, and the pulling-fingers must therefore be set close together, it is necessary to provide a peculiar stripping mechanism to take the gathered vines from the fingers, and the combination of parts by which I strip the vines from the pulling-fingers which normally lie on and follow the ground, is another important feature of my invention. Again, in order that the work of gathering and stripping may go on rapidly and without interruption it is necessary to provide simple mechanism by which the operator on the machine can readily and at will control the action of pulling and stripping of both the frames of pulling-fingers alternately, and the combination of parts by which I effect this result is still another feature of my invention.

Figure 1:
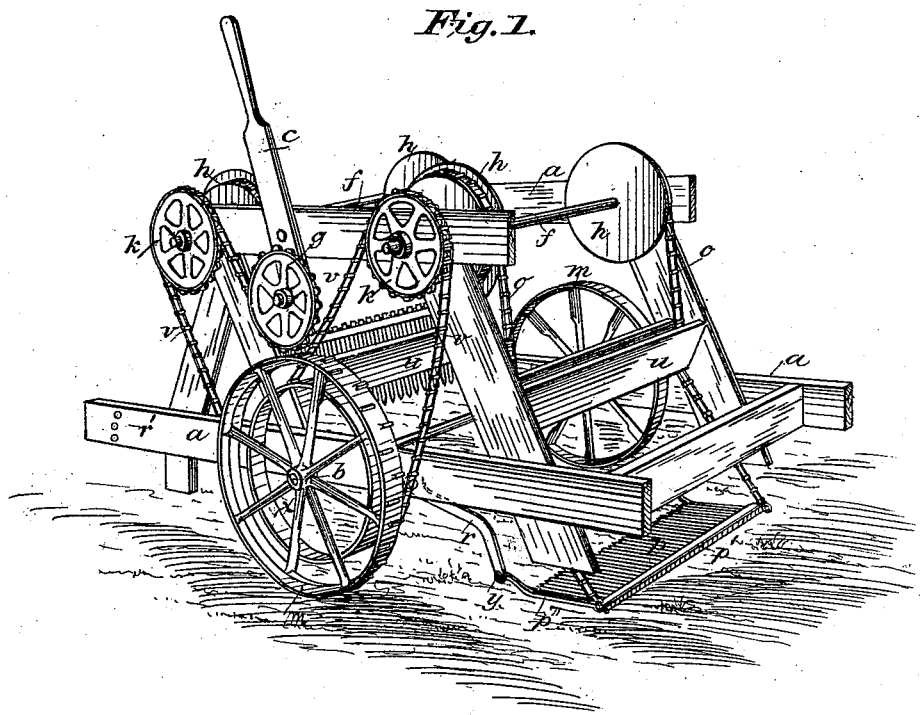
Figure 5:
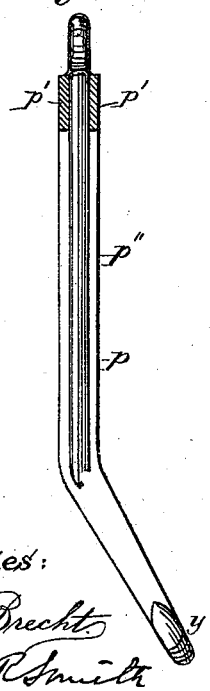
Figure 4:
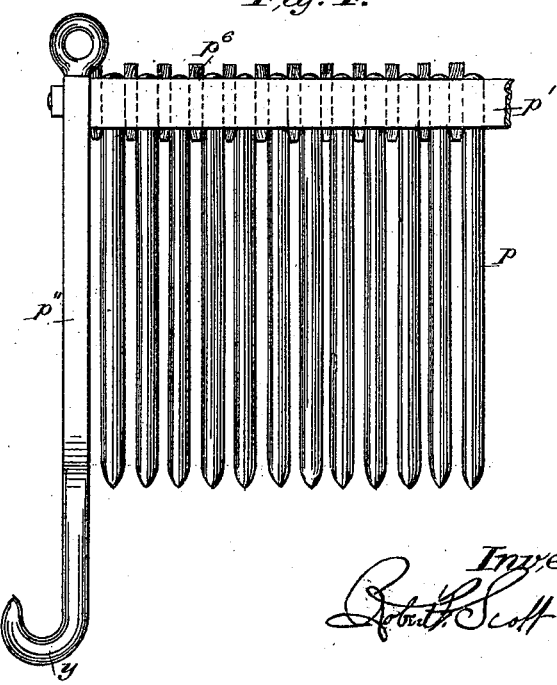
Figure 2:
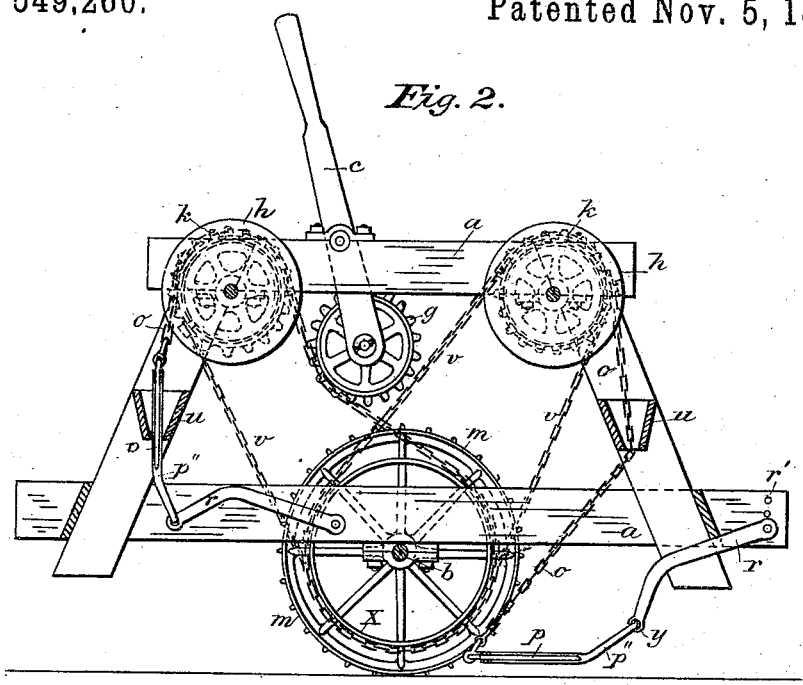
Figure 3:
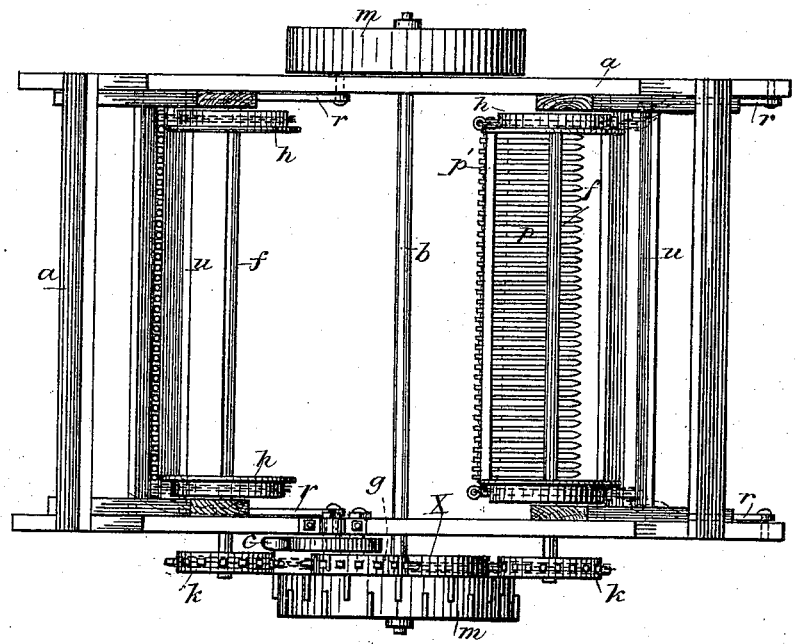

In the drawings, Figure 1 is a perspective; Fig. 2, a vertical central section; Fig. 3, a plan; Fig. 4, a detail of the pulling-fingers, and Fig. 5 a section of the same.

Coming now to a specific description of the machine, it consists of a frame $a$, mounted upon traction-wheels $m$ upon a shaft $b$. The parallel pulling-fingers $p$ are mounted by means of wedges $p^6$ between bars $p'$, to the ends of which are rigidily attached draw-arms $p,''$ swiveled at their ends $y$ in draw-links $r$. These draw-links $r$ for the rear pulling-fingers are pivoted in the frame $a$ slightly back of the axle $b$, and the links $r$ for the forward pulling-fingers are pivoted in apertures $r'$ at the extreme forward end of the machine-frame. There are several apertures $r'$, one above the other, to adjust the links as closely to the ground as may be necessary, so as to bring the points of the pulling-fingers near to the ground and to counteract the tendency which they have to rise into the air. To the bars $p'$ are attached chains $o$, constituting elevating devices, passing through open-bottomed troughs $u$, constituting stripping devices, which chains are attached to the winding-drums $h$ on the shafts $f$. On the outer end of the shafts $h$ are fixed sprocket-wheels $k$, around which pass normally-loose sprocket-chains $v$, which surround at their other end a drum $x$, which consists of an annular flange cast integral with the spokes of the traction-wheel $m$. Between the two sprocket-chains $v$, I pivot an arm $c$, carrying on its outer end a belt-tightening roller $g$.

The construction and arrangement of the pulling-fingers are readily seen from the drawings. There are a number of these fingers, which are set so as to be parallel throughout a considerable portion of their length and are spaced apart a distance substantially equal to the diameter of the vine to be pulled. This gives me a number of acting pulling-points throughout the length of the fingers, as will be evident.

It will also be seen that the links $r$ constitute drawing devices, which drawing devices in the opposite sides of the machine are movable independently of each other, thus allowing the pulling-frame to follow lateral inequalities of the ground. These drawing devices are also loosely attached to both the machine-frame and pulling-finger frame, thus allowing the latter to follow longitudinal inequalities of the field.

Attention is further called to the fact that the draw-arms $p''$ extend some inches beyond the points of the pulling-fingers. The useful function for this construction is developed in the operation of dropping the frame of the pulling-fingers to the ground after the vines have been discharged. The arrangement of the pivots and links is such that the frame of these fingers would sometimes naturally fall forward by gravity in the direction of motion of the carriage; but by having these extended portions of the arms they come in contact with the ground, thus supporting the points of the pulling-fingers above the ground, so that the vines upon the field are forced against these points and swing the frame back upon the ends of the draw-arms $p''$ as centers. These extended arms $p''$ also prevent the points of the fingers from digging into the ground at the start.

In the operation of the machine it is drawn over the field by suitable power, the pulling-fingers lying flat on and following the ground and catching the vines at their roots, which, passing in single file between the fingers, are drawn forcibly from the earth. When the forward fingers are full, the belt-tightener is thrown against the forward sprocket-chain $v$, thus tightening the chain on the drum $x$ and communicating motion in the proper direction to the forward shaft $f$. The rotation of this shaft $f$ winds the chains $o$ upon the winding-drums $h$, thus rotating the bars $p'$ of the forward frame of the pulling-fingers in the air about $y$ as a center until the bars $p'$ are immediately under the open end of the trough $u$. Further motion then turns the draw-links $r$ upon their center $r'$ and draws the pulling-fingers into this trough, the sides of which effectively strip the vines therefrom. During this stripping operation of the front fingers it will be seen that the rear fingers are at work, and this leaves no portion of the ground unoperated upon. By reversing the position of the belt-tightener the rear fingers are similarly stripped.

What I claim is—

1. The combination of a carriage, a frame of pulling fingers and independently movable drawing devices on the opposite sides of the frame attached to the carriage and frame whereby the frame is drawn forward by movement of the carriage and can follow lateral inequalities of the ground substantially as described.

2. The combination of a carriage, a frame of pulling fingers and independently movable drawing devices on the opposite sides of the frame loosely attached to both the carriage and frame whereby the frame is drawn forward by movement of the carriage and can follow both lateral and longitudinal inequalities of the ground substantially as described.

3. The combination of a carriage, two frames of pulling fingers attached thereto, stripping devices on the carriage, elevating devices for raising the frames past the stripping devices and means for alternately throwing the elevating devices into action substantially as described.

4. The combination of a carriage, an open bottomed trough attached thereto, a frame of pulling fingers loosely suspended below the trough and elevating devices attached to the frame for drawing it bodily through the trough to strip the vines from the fingers substantially as described.

5. The combination of a carriage, draw links loosely connected therewith and a frame of pulling fingers having draw arms secured thereto extending beyond the points of the fingers, said extended portions of the draw arms being loosely connected to the draw links substantially as described.

6. The combination of the carriage, the frame of pulling fingers, the draw links attached to the carriage and frame, the elevating chains secured to the frame and the open bottomed discharge troughs substantially as described.

7. The combination of a wheeled carriage, a drum as $x$, revolved by means of the carriage wheel, a sprocket chain passing over the drum, a sprocket wheel at the other end of the chain, a shaft moved by the sprocket wheel, a frame of pulling fingers, a stripping device and intermediate devices between the shaft and frame for raising the frame past the stripping devices substantially as described.

ROBERT P. SCOTT.

Witnesses:
 FELIX R. SULLIVAN,
 HENRY J. DIXON.